Patented Feb. 13, 1951

2,541,470

UNITED STATES PATENT OFFICE 2,541,470

PHOTOGRAPHIC SILVER HALIDE DEVELOPING SOLUTIONS CONTAINING CALCIUM PRECIPITATION INHIBITORS

Richard W. Henn and John I. Crabtree, Rochester, N. Y., assignors to Eastman Kodak Company, Rochester, N. Y., a corporation of New Jersey No Drawing. Application May 28, 1947, Serial No. 751,122

7 Claims. (Cl. 95—88)

This invention relates to photography and particularly to methods and materials for preventing precipitation of calcium or other insoluble salts in photographic developers and other solutions.

This application is a continuation-in-part of application Serial No. 551,780, filed August 29, 1944, now abandoned, which is a continuation-in-part of application Serial No. 508,984, filed November 4, 1943, now abandoned.

The precipitation of insoluble calcium salts in water is a problem in many industries and is particularly objectionable in the photographic industry because of its effect on the quality of photographic films and the usability of photographic processing solutions. The use of certain complex phosphates, especially polymerized sodium metaphosphate and sodium or potassium pyro phosphates, in photographic developers to reduce the formation of calcium sulfite scum on the films and calcium precipitates in the developer is known. Upon standing in aqueous solutions in the absence of a polyhydroxy carboxylic acid, all of these phosphates gradually hydrolyze to the orthophosphates ($Na_3PO_4$, $Na_2HPO_4$ or $NaH_2PO_4$, depending upon the pH) which not only possess no inhibiting properties but may also precipitate the calcium themselves as the flocculent calcium orthophosphates. In addition to this difficulty, the addition of an excess of these inhibitors to alum fixing baths as when carried over from the developer, causes the precipitation of aluminum phosphate.

If the metaphosphate and pyrophosphate are expressed in terms of the ratio of sodium oxide to phosphorus pentoxide, it will be seen that sodium metaphosphate has the formula $$Na_2O \cdot P_2O_5$$

and sodium pyrophosphate has the formula $$2Na_2O \cdot P_2O_5$$

It is, therefore, an object of the present invention to provide a method for preventing precipitation of insoluble calcium salts in water. A further object is to provide a method for preventing the precipitation of calcium and the formation of a calcium sulfite scum on photographic films when treated in a developing bath. Other objects will appear from the following description of our invention.

These objects are accomplished by using as a calcium precipitation inhibitor an alkali metal phosphate together with a polyhydroxy carboxylic acid or, in certain cases, by using an alkali metal "polyphosphate" alone. Our invention includes developers containing such compounds, both in the wet and the dry form.

By "polyphosphate" we mean a compound of the general formula $xM_2O \cdot yP_2O_5$, where $M_2O$ represents an alkali metal oxide such as sodium, potassium or ammonium oxide, and the ratio of $x$ to $y$ is greater than 1 but less than 2. These compounds fall in a class also known as "molecularly dehydrated phosphates" (Schwartz and Munter, Ind. & Eng. Chem., 34, 32; 1942).

Examples of the polyphosphates which we propose to use are sodium tetraphosphate, $$3Na_2O \cdot 2P_2O_5$$

sodium tripolyphosphate, $5Na_2O \cdot 3P_2O_5$; and a compound having the formula $6Na_2O \cdot 5P_2O_5$. These compounds have the advantage over sodium metaphosphate ($Na_2O \cdot P_2O_5$) and sodium pyrophosphate ($2Na_2O \cdot P_2O_5$) of (1) more nearly equal sequestering power for calcium and magnesium (for example, metaphosphates are weakly sequestering for magnesium while pyrophosphates are relatively weakly sequestering for calcium) (2) less change in pH on hydrolysis in mildly alkaline developers, and (3) in some cases, have superior keeping properties.

Carboxylic acids, more particularly polyhydroxy carboxylic acids, form complexes with calcium salts which delay the precipitation of the calcium. These acids or their salts, when added to the developer in sufficient quantity, will delay the formation of the calcium sludge normally formed when calcium is added as an impurity in the water or from the film. On standing for any considerable period of time, however, this type of complex decomposes, freeing the calcium for precipitation by sulfite, carbonate, etc.

The principal novelty of the present invention lies in the employment of a complex alkali-metal phosphate, for example, an alkali-metal salt of metaphosphoric acid, pyrophosphoric acid or tetraphosphoric acid in conjunction with a polyhydroxycarboxylic acid or an alkali-metal salt of such acid in order to prevent the precipitation of calcium in an alkaline solution containing calcium salts or other salts which are subject to precipitation in insoluble form. Our invention also includes the discovery of the superior value of sodium tetraphosphate or other "polyphosphate" as a calcium precipitation inhibitor when compared with previously known inhibitors such as sodium hexametaphosphate or sodium pyrophosphate.

Sodium hexametaphosphate ($NaPO_3$)$_6$ and potassium pyrophosphate ($K_4P_2O_7$) have previously been used in photographic developers. Sodium tetraphosphate ($Na_6P_4O_{13}$) has not previously been used in developers and possesses advantages over both the hexametaphosphate and the pyrophosphate as pointed out below. Any of the water-soluble alkali-metal salts of these compounds may be used such as the sodium or potassium salts.

We have found that the inhibiting value of all of these phosphates is improved by using them in conjunction with a polyhydroxy carboxylic acid such as tartaric, gluconic, mucic, ascorbic saccharic or gallic. The alkali-metal salts of these acids may also be employed.

Effective concentrations of the polyhydroxy carboxylic acids range from 0.5 to 200 grams per liter of solution and are employed with phosphate concentrations of from 0.2 to 20 grams per liter. The most useful quantity will vary with the composition of the developer; for example, low pH developers, such as the following.

I

| | |
|---|---|
| Monomethyl-p-aminophenol sulfate_____g__ | 2 |
| Hydroquinone _____g__ | 5 |
| Sodium sulfite, desiccated_____g__ | 100 |
| Borax _____g__ | 2 |
| Water to _____liter__ | 1 | will require smaller quantities than alkaline carbonate developers, such as the following

II

| | |
|---|---|
| Monomethyl-p-aminophenol sulfate____g__ | 2.2 |
| Hydroquinone _____g__ | 8.8 |
| Sodium sulfite, desiccated_____g__ | 96 |
| Sodium carbonate, desiccated_____g__ | 48 |
| Potassium bromide_____g__ | 5 |
| Water to _____liter__ | 1 | and in general, possess better keeping properties. In addition to protecting the developer, the employment of the polyhydroxy acid with the phosphate will greatly reduce the tendency for aluminum phosphate formation in the fixing bath and the attendant sludge.

The combination of an alkali-metal phosphate with a polyhydroxy carboxylic acid possesses an effectiveness far in excess of either group of compounds when used alone, with regard to stability toward precipitation on storage. This is illustrated by the following example:

If one gram of calcium chloride is added to one liter of developer I, an immediate precipitation of calcium sulfite occurs. If 2.5 grams of sodium tetraphosphate are present per liter of developer, no immediate precipitate occurs but one will appear when this solution is held at 100° C. for approximately 2½ minutes. If 20 grams of gluconic acid are added per liter in place of the tetraphosphate and the solution held at 100° C., a precipitate will appear in about ½ minute. If both the 2.5 grams of tetraphosphate and 20 grams of gluconic acid are added, no precipitate will occur on keeping the resulting solution for a period of 30 minutes at 100° C.

The use of these inhibitors need not be confined to the developer but may be extended to other baths where an insoluble calcium precipitate, aluminum precipitate or precipitate of other polyvalent metal occurs. For example, certain wetting agents used for drying film precipitate with hard water or with aluminum contaminant from the fixing bath. Small quantities of a combination of phosphate and polyhydroxy carboxylic acid effectively inhibit this precipitation.

The improved properties of salts of tetraphosphoric acid, when compared with those of pyrophosphoric acid or metaphosphoric acid are apparent from the following table. As shown therein, the calcium precipitation inhibiting bath of the various salts was measured in the developer of Example 7 (without the tetraphosphate) diluted one part of stock solution to two parts of distilled water.

| Salt Tested | Calcium Precipitation Inhibiting Power (Grams per Liter of Calcium Chloride to Cause Precipitate; 2 Grams per Liter of Phosphate in Developer of Ex. 7 (1:2) | Stability Towards Hydrolysis (Min. of Boiling Solution of Developer of Ex. 7 (1:2) Containing 2 Grams per Liter of Phosphate +0.15 Gram per liter of Calcium Chloride) | Precipitation with Alum (Grams per Liter of Potassium Alum to Precipitate 1% Phosphate Solution) |
|---|---|---|---|
| 1. Sodium Hexametaphosphate | 0.6 | 4 | 5 |
| 2. Potassium pyrophosphate | 0.4 | 2 | 3 |
| 3. Sodium Tetraphosphate | 0.75 | 7 | 10 |
| 4. None | 0.15 | ¼ | |

Our invention will be further illustrated by reference to the following examples:

EXAMPLE 1

To a developer of the following composition:

| | |
|---|---|
| Monomethyl-p-aminophenol sulfate _____grams__ | 2 |
| Hydroquinone _____do____ | 5 |
| Sodium sulfite (anhydrous) _____do____ | 100 |
| Borax _____do____ | 2 |
| Water to _____liter__ | 1 | there were added 0.5 gram of sodium hexametaphosphate and 2 grams of gluconic acid. These protect the developer against 0.7 gram of calcium chloride during a storage period of 6 weeks at 43° C.

EXAMPLE 2

To the developer formula of Example 1, 2.5 grams of sodium tetraphosphate and 10 grams of sodium salt of mucic acid are added. These protect the developer against precipitation by one gram of calcium chloride which would cause a dense precipitate if they were not present. On boiling, this combination was stable for 4 times the period of a similar solution containing the tetraphosphate but no mucic acid.

EXAMPLE 3

To developer II there were added 5 grams of tetrapotassium pyrophosphate and 30 grams of saccharic acid. These conditions prevent the formation of a developer sludge even at a high degree of exhaustion.

EXAMPLE 4

To developer II, 2.5 grams of sodium tetraphosphate and 20 grams of gallic acid were added and then 0.7 gram of calcium chloride was added. No precipitation occurred and, on boiling, this solution was stable for 20 times the period of the same solution containing sodium tetraphosphate and calcium chloride but no gallic acid.

EXAMPLE 5

The following solution is used for drying film, using hard water (5½ grains per gallon temporary hardness):

| | |
|---|---|
| Water cc | 500 |
| Sodium tetraphosphate gram | 0.2 |
| Sodium gluconate do | 0.5 |
| Dioctyl ester of sodium sulfosuccinic acid (10% solution in ethyl alcohol) cc | 10 |
| Water to liter | 1 |

In the absence of the precipitation inhibitors, the dioctyl ester of sodium sulfosuccinic acid yields only a very cloudy solution. Even when prepared with distilled water, it soon precipitates as it is contaminated with the wash water and with traces of aluminum carried through from the fixing bath. In the presence of the inhibitors the solution is entirely clear and remains so throughout a normal exhaustion life.

EXAMPLE 6

To the developer of Example 1 there was added 0.5 gram of sodium tetraphosphate. This developer was found to tolerate the addition of over 2 grams of anhydrous calcium chloride or its equivalent per liter without allowing the formation of a precipitate and also was found to prevent the formation of calcium sulfite scum on films even after 4 weeks' storage at 75° F.

EXAMPLE 7

To the following formula

| | |
|---|---|
| Monomethyl-p-aminophenol sulfate grams | 3.1 |
| Hydroquinone do | 12 |
| Sodium sulfite (anhydrous) do | 45 |
| Sodium carbonate (anhydrous) do | 67.5 |
| Potassium bromide do | 1.9 |
| Water to liter | 1 | there was added 6 grams of sodium tetraphosphate. This developer, when diluted one part with 2 parts of water, did not produce pronounced sludge even after development of 70 8 x 10 inch sheets of photographic paper while the corresponding formula without the employment of the tetraphosphate produced sludge.

EXAMPLE 8

Compartment A

| | Grams |
|---|---|
| Monomethyl-p-aminophenol sulfate | 5.0 |
| Sodium tetraphosphate | 0.5 |

Compartment B

| | Grams |
|---|---|
| Sodium sulfite (anhydrous) | 100.0 |
| Sodium metaborate | 2.0 |
| Potassium thiocyanate | 1.0 |
| Potassium bromide | 0.5 |

These chemicals are sufficient to make 1 liter of developer when added to water. The tetraphosphate is incorporated in the package in order to produce a clear solution upon mixing with hard water.

EXAMPLE 9

Compartment A

| | Grams |
|---|---|
| Monomethyl-p-aminophenol sulfate | 4.0 |
| Hydroquinone | 12.0 |

Compartment B

| | Grams |
|---|---|
| Sodium sulfite (anhydrous) | 45.0 |
| Sodium carbonate (anhydrous) | 67.5 |
| Potassium bromide | 1.9 |
| Sodium tetraphosphate | 6.0 |
| Sodium gluconate | 24.0 |

These chemicals are sufficient to make 1 liter of stock solution. The presence of the sodium tetraphosphate insures a clear solution on mixing with hard water, while the sodium gluconate decreases the rate of hydrolysis of the tetraphosphate while standing in solution.

EXAMPLE 10

In any of the above solid mixtures containing alkali-metal polyphosphates the tendency of the polyphosphate to fuse or become tacky on exposure to moist air may be overcome by mixing an inert alkali-metal sulfate, such as anhydrous sodium or potassium sulfate, with the polyphosphate. A mixture of one part of sodium tetraphosphate with two parts of anhydrous sodium sulfate or potassium sulfate was found to remain free flowing upon an exposure to an atmosphere of 70% relative humidity for two weeks, the concentration may vary from one part of polyphosphate in from ½ to 20 parts of alkali-metal sulfate.

EXAMPLE 11

The presence of iron in some polyphosphates may cause increased development fog. This fog may be controlled by the addition of antifoggants such as alkali-metal bromides and iodides, or organic antifoggants such as 1, 2, 3-benzotriazole and 6-nitrobenzimidazole. A sample of sodium hexametaphosphate containing 0.03% of iron was found to give bad fog when added to developing solutions for high speed negative emulsions. The presence of 0.05 gram of 1,2,3-benzotriazole per gram of sodium hexametaphosphate prevented this fog.

The concentration of antifoggant may vary from 1 part of antifoggant to from 2 to 200 parts of phosphate in the case of potassium iodide, 1,2,3-benzotriazole and 6-nitrobenzimidazole nitrate and from 1 part of antifoggant to from 0.1 to 10 parts of phosphate in the case of potassium bromide.

EXAMPLE 12

To the formula of Example 7, diluted 1 part to 2 parts of water (without the tetraphosphate) there was added 2 grams per liter of sodium tripolyphosphate ($Na_5P_3O_{10}$). This prevented precipitation of calcium when present at a concentration of 500 parts per million (expressed as $CaCl_2$).

EXAMPLE 13

To Formula I there was added 0.5 gram per liter of sodium tripolyphosphate. This prevented precipitation of calcium when present at concentration of over 1000 parts per million (expressed as $CaCl_2$).

EXAMPLE 14

$Na_{12}P_{10}O_{31}$ ($6Na_2O.5P_2O_5$) when used to replace sodium tripolyphosphate in Examples 12 and 13, was found to function successfully as a calcium sequestering agent.

It will be understood that the examples included herein are illustrative only and that our invention is to be taken as limited only by the scope of the appended claims.

We claim:

1. An alkaline photographic developing solution comprising a silver halide developing agent, from 0.2 to 20 grams per liter of solution of an alkali-metal phosphate having the formula $$xM_2O \cdot yP_2O_5$$

where M is an alkali metal, and $x$ and $y$ represent numbers in which the ratio of $x$ to $y$ is greater than 1 but less than 2, an alkaline material, and from 0.5 to 200 grams per liter of solution of a polyhydroxy carboxylic acid.

2. An alkaline photographic developing solution comprising a silver halide developing agent, from 0.2 to 20 grams per liter of solution of an alkali-metal salt of tetraphosphoric acid, an alkaline material, and from 0.5 to 200 grams per liter of solution of a polyhydroxy carboxylic acid.

3. An alkaline photographic developing solution comprising a silver halide developing agent an alkaline material, and from 0.2 to 20 grams per liter of solution of sodium tetraphosphate.

4. A photographic developer in dry form comprising a silver halide developing agent, sufficient alkali-metal phosphate having the formula $$xM_2O \cdot yP_2O_5$$

where M is an alkali metal, and $x$ and $y$ represent numbers in which the ratio of $x$ to $y$ is greater than 1 but less than 2, to produce 0.2 to 20 grams per liter in solution, a sufficient amount of a compound selected from the class consisting of polyhydroxy carboxylic acids and their alkali-metal salts to produce 0.5 to 200 grams per liter in solution, and sufficient alkaline material to produce an alkaline developing solution.

5. A photographic developer in dry form comprising a silver halide developing agent, sufficient alkali-metal salt of tetraphosphoric acid to produce 0.2 to 20 grams per liter in solution, a sufficient amount of a compound selected from the class consisting of polyhydroxy carboxylic acids and their alkali-metal salts to produce 0.5 to 200 grams per liter in solution, and sufficient alkaline material to produce an alkaline developing solution.

6. A photographic developer in dry form comprising a silver halide developing agent and sufficient alkali-metal salt of tetraphosphoric acid to produce 0.2 to 20 grams per liter in solution, and sufficient alkaline material to produce an alkaline developing solution.

7. A dry powder composition for the preparation of photographic developing solutions by adding to water, comprising a silver halide developing agent, sufficient alkali-metal tetraphosphate to produce 0.2 to 20 grams per liter in solution and a sufficient amount of a compound selected from the class consisting of polyhydroxy carboxylic acids and the alkali-metal salts of said acids to produce 0.5 to 200 grams per liter in solution, and sufficient alkaline material to produce an alkaline developing solution when the mixture is dissolved in water.

RICHARD W. HENN.
JOHN I. CRABTREE.

REFERENCES CITED

The following references are of record in the file of this patent:

UNITED STATES PATENTS

| Number | Name | Date |
|---|---|---|
| 1,424,062 | Agnew et al. | July 25, 1922 |
| 2,019,665 | Fiske et al. | Nov. 5, 1935 |
| 2,086,867 | Hall | July 13, 1937 |
| 2,091,689 | Russell | Aug. 31, 1937 |
| 2,092,913 | Fiske | Sept. 14, 1937 |
| 2,145,827 | Chester | Jan. 31, 1939 |
| 2,168,181 | Ulrich et al. | Aug. 1, 1939 |
| 2,172,216 | Miller | Sept. 5, 1939 |
| 2,214,216 | Webster | Sept. 10, 1940 |
| 2,238,547 | Wood | Apr. 15, 1941 |
| 2,239,284 | Draisbach | Apr. 22, 1941 |
| 2,257,440 | Wood | Sept. 30, 1941 |

FOREIGN PATENTS

| Number | Country | Date |
|---|---|---|
| 471,922 | Great Britain | Sept. 13, 1937 |

OTHER REFERENCES

Washing, Cleaning and Polishing Materials, Bureau of Standards Circular C424 (1939), page 28.